(12) United States Patent
Shin et al.

(10) Patent No.: US 7,707,112 B2
(45) Date of Patent: Apr. 27, 2010

(54) PERIODICAL PAYMENT SYSTEM, CONTROL METHOD THEREOF, SERVICE PROVIDER OF THAT PAYROLL AND CONTROL METHOD THEREOF

(75) Inventors: Ho-Joon Shin, Seoul (KR); Dong-Jo Choi, Seoul (KR)

(73) Assignee: NHN Corporation, Kyunggi-do (KR)

( * ) Notice: Subject to any disclaimer, the term of this patent is extended or adjusted under 35 U.S.C. 154(b) by 52 days.

(21) Appl. No.: 11/570,334

(22) PCT Filed: Jun. 9, 2005

(86) PCT No.: PCT/KR2005/001730

§ 371 (c)(1),
(2), (4) Date: Dec. 8, 2006

(87) PCT Pub. No.: WO2005/122037

PCT Pub. Date: Dec. 22, 2005

(65) Prior Publication Data
US 2007/0179887 A1 Aug. 2, 2007

(30) Foreign Application Priority Data
Jun. 9, 2004 (KR) .................. 10-2004-0042187

(51) Int. Cl.
G06Q 40/00 (2006.01)
(52) U.S. Cl. .................. 705/42; 705/35; 705/37; 705/38; 705/39
(58) Field of Classification Search .......... None
See application file for complete search history.

(56) References Cited

U.S. PATENT DOCUMENTS 6,853,715 B2 * 2/2005 Flanagan ............... 379/201.12

2002/0156729 A1 * 10/2002 Nilson .................. 705/40

(Continued)

FOREIGN PATENT DOCUMENTS

JP 2002-204319 7/2002

(Continued)

*Primary Examiner*—Kambiz Abdi
*Assistant Examiner*—Benjamin S Fields
(74) *Attorney, Agent, or Firm*—Husch Blackwell Sanders LLP (57) ABSTRACT

Disclosed are a periodic payment system for service use fees and a control method thereof, and a service provider of the payment system and a control method thereof. The periodic payment system receiving information on credit of a subscriber from a payment information provider includes a payment acknowledgement server for determining whether or not a demanded payment is acknowledged based on the credit information of the subscriber provided by the payment information provider, and providing payment demand information to the payment information provider if it is determined that the demanded payment is acknowledged. The service provider demands a periodic fixed payment of the payment acknowledgement server irrespective of a payment application date when the subscriber applies for payment for the service use fee, and demands payment of an amount of money excluding an advance payment, which is overpaid on the payment application date, from a periodic fixed fee on a payment update date immediately after the payment application date, of the payment acknowledgement server. The payment acknowledgement server outputs a system error signal if a payment acknowledgement error occurs. Upon receiving the system error signal from the payment acknowledgement server on the payment update date, the service provider informs the subscriber of occurrence of an abnormality of payment acknowledgement. Accordingly, an ill-intentioned early secession of the subscriber from the service can be prevented and the subscriber is informed of an nonpayment due to a system error on a service fee payment.

10 Claims, 5 Drawing Sheets

U.S. PATENT DOCUMENTS

2002/0188562 A1* 12/2002 Igarashi et al. ............... 705/40
2004/0083166 A1*  4/2004 Pailles ........................ 705/40

FOREIGN PATENT DOCUMENTS

| KR | 10-2001-0035470 A | 5/2001 |
| KR | 10-2002-0003128 A | 1/2002 |
| KR | 10-2003-0014571   | 2/2003 |

* cited by examiner

PERIODICAL PAYMENT SYSTEM, CONTROL METHOD THEREOF, SERVICE PROVIDER OF THAT PAYROLL AND CONTROL METHOD THEREOF

CROSS REFERENCE TO RELATED APPLICATIONS

This application is a U.S. National Application of International Application PCT Application No. PCT/KR2005/001730 filed on Jun. 9, 2005, which claims the benefit of priority from Korean Patent Application No. 10-2004-0042187 filed on Jun. 9, 2004. The disclosures of International Application PCT Application No. PCT/KR2005/001730 and Korean Patent Application No. 10-2004-0042187 are incorporated herein by reference.

TECHNICAL FIELD

The present invention relates to a periodic payment system for service use fees and a control method thereof, and a service provider of the payment system and a control method thereof, and more particularly to a periodic payment system and a control method thereof, and a service provider of the payment system and a control method thereof, which are capable of allowing periodic fixed amounts to be paid irrespective of an application date of payment of a user, allowing an amount of money except a credit that is overpaid at the application date of payment to be paid at an update date of payment immediately after the application date of payment, and allowing a subscriber to be informed of a payment acknowledgement error if it occurs at the update date of payment.

BACKGROUND ART

A service provider refers to an enterpriser who provides various kinds of material and nonmaterial goods and services. In recent years, particularly, service providers have run businesses through the Internet to provides diverse service goods, such as on-line games, multimedia contents, and community services, most of which were provided without a fee at an earlier period of spread of the Internet.

However, with the recent increase of recognition of economic value of Internet service goods in the marketplace, a charging system has been employed for the Internet service goods. Such a charging system may be generally divided into a flat sum system in which a user can freely use services provided by a service provider with periodic payment of a fixed amount of money, and an individual payment system in which a user pays a fee for individual service goods to be used.

The flat sum system is divided into a pre-payment system and a post-payment system according to a payment date in a period of use of a service.

The post-payment system is a system of paying a service use fee, for example, at the end of every month if service subscribers pay the service use fee monthly. However, in many cases, service subscribers secede from the service after having used the service provided by the service provider, which may result in great economical damage to the service provider. Accordingly, for the purpose of avoiding such damage, the service providers have introduced the pre-payment system of the flat sum system.

However, in the pre-payment system of the flat sum system, for example if the service subscriber pays the service use fee at the beginning of every month for a period of one month, when the subscriber applies for first payment at the end of a month and pays a fee corresponding to a period of time remaining in that month, there arises a problem similar to the post-payment system of the flat sum system. That is, if a subscriber with ill intentions enjoys all services provided to subscribers who select the flat sum system for a short time and then secedes from the service before the next payment date, the service provider suffers an economic loss while the subscriber enjoys the service far more cheaply than the normal fee.

On the other hand, a payment system in the flat sum system includes a system in which a subscriber applies for payment for every period of payment and a system in which payment is automatically performed for every period of update of payment from a payment update date immediately after a payment application date as long as a subscriber does not apply for annulment of service use.

However, in the former payment system, it is inconvenient for a subscriber who continues to use services provided by the service provider to repeat a payment application procedure for every period of payment, particularly in the case of a small amount of payment. For that reason, the latter automatic payment system has been more frequently used.

However, in the automatic payment system, if a payment acknowledgement error occurs on a payment update date due to an abnormality of the service use fee payment system, the service provider annuls service use of the subscriber irrespective of intention of the subscriber for the reason that the subscriber has not paid a service use fee for the corresponding period.

In this case, a problem arises in that a subscriber who completes a payment application procedure must apply for payment again without being aware of the cause of the annulment of service. Particularly, such a problem become serious when continuity of service is important, as in a case where a subscriber receives a benefit only when he continues to use the service for more than a prescribed time, or when a subscriber who does not use the service from a payment update date on which a payment acknowledgement error occurs becomes aware of annulment of his service use after a certain period of time elapses.

DISCLOSURE

Technical Problem

In order to solve the above-mentioned problems, it is an object of the present invention to provide a periodic payment system and a control method thereof, and a service provider of the payment system and a control method thereof, which are capable of allowing a full payment of a periodic fixed amount to be paid irrespective of a subscription date, allowing a prorated amount out of the received full payment of the periodic fixed fee to be applied to the first time period, the remaining amount of the received full payment to be applied to the second time period as a credit, and outstanding balance to be paid at a payment date of the time period immediately subsequent to the subscription date. It is another object of the present invention to provide a periodic payment system and a control method thereof, and a service provider of the payment system and a control method thereof, which are capable of allowing a subscriber to be informed of a payment acknowledgement error if it occurs at a payment update date.

Technical Solution

To achieve the above objects, according to an aspect, the present invention provides a periodic payment system for a service use fee, the periodic payment system receiving information on credit of a subscriber from a payment information provider, including a payment acknowledgement server for determining whether or not a demanded payment is acknowledged based on the credit information of the subscriber provided by the payment information provider, providing payment demand information to the payment information provider if it is determined that the demanded payment is acknowledged, and outputting a system error signal if a payment acknowledgement error occurs; and a service provider for demanding a periodic fixed payment of the payment acknowledgement server irrespective of a subscription date when the subscriber applies for payment for the service use fee, demanding payment of outstanding balance, from a periodic fixed fee on a payment date of the time period immediately subsequent to the subscription date, of the payment acknowledgement server, and, upon receiving a system error signal from the payment acknowledgement server on the payment update date, informing the subscriber of occurrence of abnormality of payment acknowledgement.

Here, the periodic payment system can include further a mobile terminal of the subscriber, and the payment information provider includes a mobile communication service provider having a mobile communication company server for providing a mobile communication service to the subscriber and a mobile communication subscriber database storing information on use of the mobile communication service of the subscriber. In addition, the payment acknowledgement server provides a payment authentication key to the mobile communication service provider upon receiving a payment demand from the service provider through the mobile terminal of the subscriber, causes the mobile communication service provider to transmit the payment authentication key to the mobile terminal, and acknowledges the payment upon receiving the payment authentication key from the subscriber.

According to another aspect, the present invention provides a method of controlling a periodic payment system for a service periodic fixed fee, the method including the steps of paying a periodic fixed fee for service for which a subscriber applies for periodic fixed payment; calculating a prorated amount out of the received full payment on the basis of a subscription date; applying the remaining amount of the received full payment as a credit to the next time period; and, if the subscriber does not request annulment of service use on a payment date of the time period immediately subsequent to the subscription date, acknowledging payment of the outstanding balance for the second time period, and, if a payment acknowledgement error occurs on the payment update date, informing the subscriber of the occurrence of the payment acknowledgement error.

Here, the method can include further the steps of applying re-payment after a prescribed period of time elapses from the date on which the payment acknowledgement error occurs; paying an outstanding balance; calculating credit overpaid on the basis of the re-payment application date; storing the overpaid credit; and, if the subscriber does not request annulment of service use on a payment date of the time period immediately subsequent to the re-payment application date, paying an amount of money excluding the credit overpaid on the re-payment application date from the periodic fixed fee.

According to yet another aspect, the present invention provides a service provider for providing a service to subscribers on the basis of a periodic fixed fee system, wherein the service provider causes a periodic fixed fee to be paid irrespective of a subscription date when the subscribers apply for payment of the periodic fixed fee for the service, causes an outstanding balance to be paid on a payment date of the time period immediately subsequent to the subscription date, and, if a payment acknowledgement error occurs on the payment update date, informs the subscribers of occurrence of an abnormality of payment acknowledgement.

Here, the service provider can include further a use particulars database in which information on use particulars of the subscribers is stored. When the payment acknowledgement error occurs, the service provider grants the subscribers the right to use the service for a prescribed time if the subscribers are credited with the advance payment, with reference to the use particulars database.

According to yet another aspect, the present invention provides a method of controlling a service provider for providing a service to subscribers on the basis of a periodic fixed fee system, the method including the steps of paying a periodic fixed fee for service goods for which a subscriber applies for periodic fixed payment; calculating a credit on the basis of a payment application date or subscription date; storing the advance payment; and, if the subscriber does not request annulment of service use on a payment date of the time period immediately subsequent to the payment application date or subscription date, paying an amount of money excluding the advance payment from the periodic fixed fee, and, if a payment acknowledgement error occurs on the payment update date, informing the subscriber of the occurrence of the payment acknowledgement error.

And, the method can include further the steps of applying re-payment after a prescribed period of time elapses from the date on which the payment acknowledgement error occurs; paying an amount of money carried forward from a period of payment immediately before the re-payment application date from a periodic fixed fee; calculating an advance payment overpaid on the basis of the re-payment application date; storing the overpaid advance payment; and, if the subscriber does not request annulment of service use on a payment date of the time period immediately subsequent to the re-payment application date, paying an amount of money excluding the advance payment overpaid on the re-payment application date from the periodic fixed fee.

MODE FOR INVENTION

Hereinafter, preferred embodiments of the present invention will be described in detail with reference to the accompanying drawings.

Figure 1:
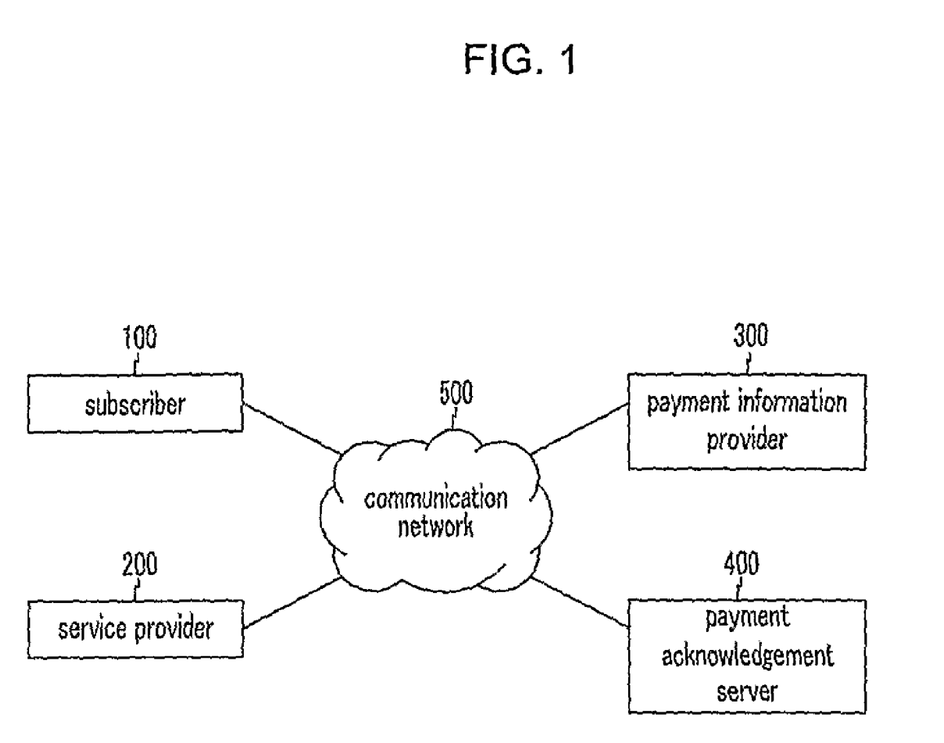
FIG. 1 is a diagram illustrating configuration of a payment system according to an embodiment of the present invention.

As shown in FIG. 1, a periodic payment system for service use fees according to an embodiment of the present invention includes a subscriber 100 who uses a service, a service provider 200, a payment acknowledgement server 400, and a payment information provider 300.

The payment information provider 300 provides information on credit of the subscriber 100, and demands payment for service use of the subscriber 100 based on payment demand information including payments for service use of the subscriber 100.

The payment acknowledgement server 400 determines whether the demanded payment is acknowledged based on the credit information of the subscriber 100 provided by the payment information provider 300.

Accordingly, the payment acknowledgement server 400 rejects payment acknowledgement if the credit information of the subscriber 100 provided by the payment information provider 300 dos not accord with information on the subscriber 100 received from the subscriber 100 or the service provider 200. Or, the payment acknowledgement server 400 rejects payment acknowledgement when it is determined based on the credit information that the subscriber 100 has bad credit or the total amount of payment of the subscriber 100 exceeds a limit amount.

On the contrary, the payment acknowledgement server 400 acknowledges payment if the credit information of the subscriber 100 provided by the payment information provider 300 accords with the information on the subscriber 100 received from the subscriber 100 or the service provider 200, or when it is determined based on the credit information that the subscriber 100 has good credit or the total amount of payment of the subscriber 100 is less than a limit amount. Then, the payment acknowledgement server 400 provides the payment demand information to the payment information provider 300.

Figure 2:
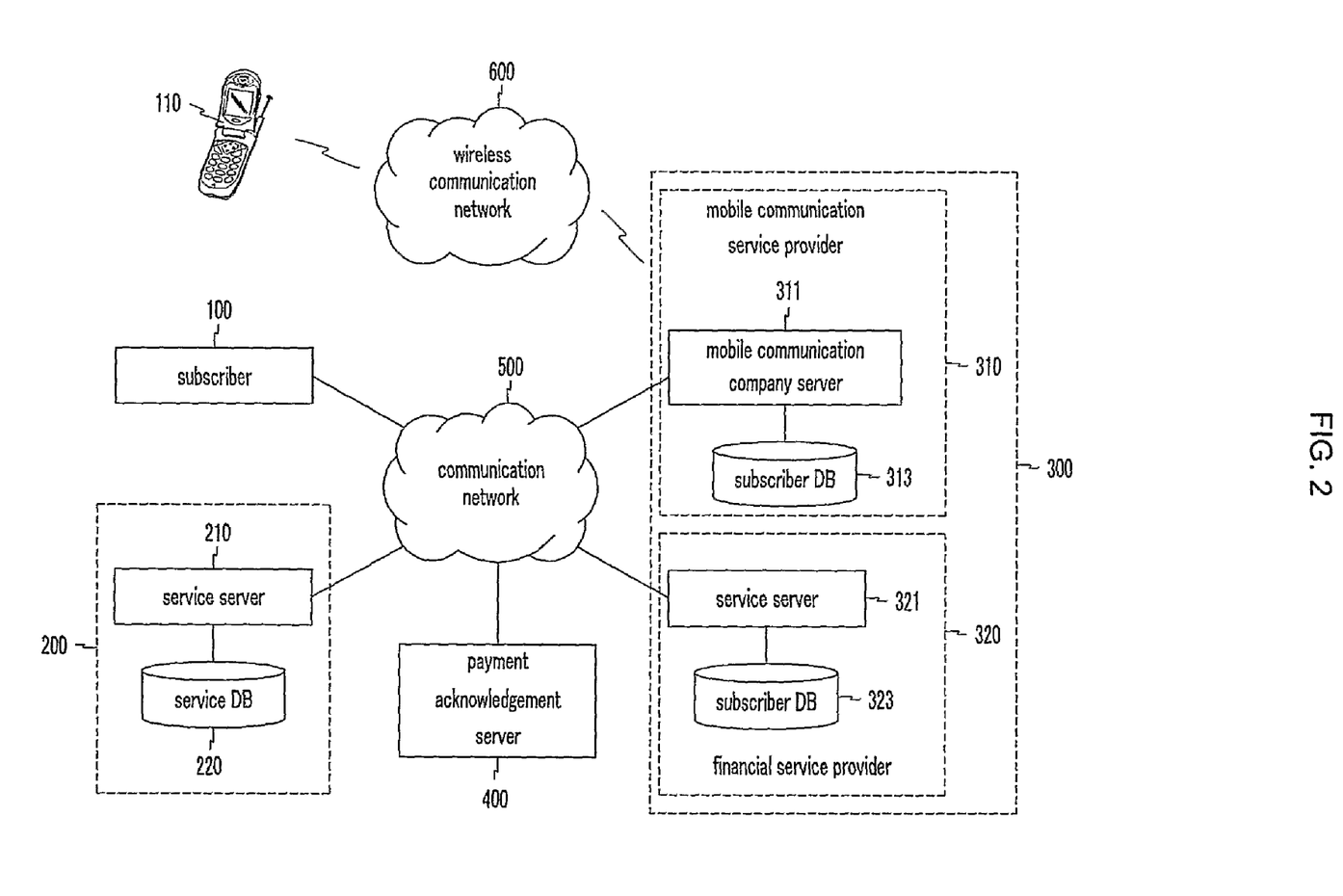
FIG. 2 is a detailed configurational diagram of FIG. 1.

As shown in FIG. 2, the payment information provider 300 includes a mobile communication service provider 310 and a financial service provider 320.

The finance service provider 320 includes a financial company server 321 and a financial client database 323 storing information on use of clients who use financial companies. The mobile communication service provider 310 includes a mobile communication company server 311 providing a mobile communication service to the subscriber 100 and a mobile communication subscriber database 313 storing information on mobile communication service use of the subscriber 100.

If the subscriber 100 selects a mobile terminal 110 as payment means of the service use fee, the payment acknowledgement server 400 receives the payment demand from the service provider 200 through the mobile terminal 110 of the subscriber 100. Then, the payment acknowledgement server 400 generates a payment authentication key and causes the mobile communication service provider 310 to transmit the generated payment authentication key to the mobile terminal 110. Then, the payment acknowledgement server 400 acknowledges the payment upon receiving the payment authentication key from the subscriber 100.

For example, when the subscriber 100 who has accessed the service provider 200 applies to the service provider 200 for service use and selects a portable telephone as a payment means, the service provider 200 transmits a payment demand through the portable telephone of the subscriber 100 to the payment acknowledgement server 400. Then, the payment acknowledgement server 400 generates a payment authentication key consisting of a series of numbers and transmits the generated payment authentication key to the mobile communication service provider 310, which then displays the payment authentication key on the portable telephone of the subscriber 100. In addition, the payment acknowledgement server 400 prepares an authentication window in which the subscriber 100 inputs the payment authentication key.

The subscriber 100 inputs the payment authentication key displayed on the portable telephone in the authentication window. Then, if the payment authentication key input through the authentication window accords with the originally generated payment authentication key, the payment acknowledgement server 400 acknowledges the payment and provides the payment demand information to the mobile communication service provider 310. Then, the mobile communication service provider 310 demands an amount of money contained in the payment demand information, together with a mobile communication fee, from the subscriber 100.

Similarly, if the subscriber 100 selects a credit card as payment means for the service use fee, the payment acknowledgement server 400 receives a payment demand through the credit card from the service provider 200. Then, if the subscriber 100 has good credit and credit information input by the subscriber 100 accords with subscriber credit information possessed by the financial service provider 320, the payment acknowledgement server 400 informs the subscriber 100 of payment acknowledgement and transmits the payment demand information for the service use fee to the financial service provider 320.

The service provider 200 provides the service to the subscriber 100 and requests the payment acknowledgement server 400 for periodic fixed payment irrespective of an application date of payment upon receiving an application for payment for the service use fee from the subscriber 100. In addition, the service provider 200 requests the payment acknowledgement server 400 for payment of money excluding an advance payment, which is overpaid at the application date of payment, from the periodic fixed payment at a update date immediately after the application date of payment.

However, if an abnormality in establishment of a communication channel occurs between the payment acknowledgement server 400 and the payment information provider 300 including the mobile communication service provider 310 and the financial service provider 320, the payment acknowledgement server 400 cannot acknowledge the payment since it cannot receive the credit information on the subscriber 100 from the payment information provider 300. At this time, the payment acknowledgement server 400 outputs a system error signal to the service provider 200 according to a payment acknowledgement error, thus informing the service provider 200 that the requested payment cannot be acknowledged due to a system error.

Or, a payment acknowledgement error may occur due to a transient excess of a mobile payment limit, a temporary stop of unknown causes, or the like.

Upon receiving the system error signal from the payment acknowledgement server 400 on the update date of payment, the service provider 200 informs the subscriber 100 of the occurrence of the payment acknowledgement error.

Figure 3:
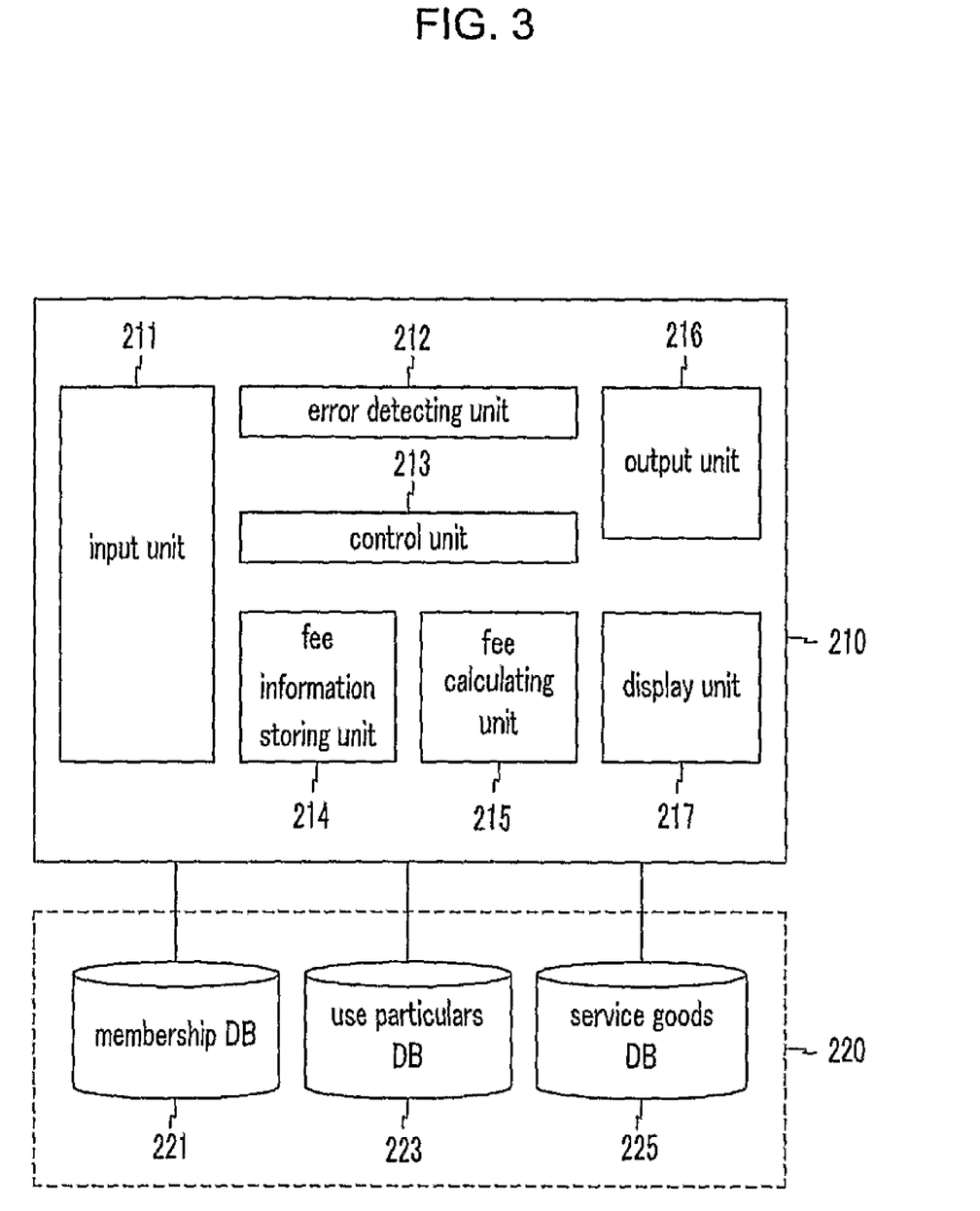
FIG. 3 is a block diagram of a service provider shown in FIG. 1.

Now, referring to FIG. 3, the service provider 200 includes an input unit 211 for receiving an application signal from the subscriber 100, a fee information storing unit 214 in which periodic fixed fee information according to the kind of service is stored, a fee calculating unit 215 for calculating an amount of money demanded of the payment acknowledgement server 400, an output unit 216 for outputting a demand signal to the payment acknowledgement server 400, a display unit 217 for outputting information to the subscriber 100, an error detecting unit 212 for detecting the system error signal, and a control unit 213.

When a payment application signal is input from the input unit 211 to the control unit 213, the control unit 213 causes a fixed payment demand signal, based on the periodic fixed fee information stored in the fee information storing unit 214, to be transmitted from the output unit 216 to the payment acknowledgement server 400, irrespective of the subscription date.

In addition, the control unit 213 causes the fee calculating unit 215 to calculate a balance of a prorated amount out of the received full payment of the periodic fixed fee to the first time period. The prorated amount is calculated based upon the remaining days of the first time period from the starting date of the subscription. Next, the control unit 213 causes a balance payment demand signal to be transmitted through the output unit 216 to the payment acknowledgement server 400.

At this time, the advance payment may be configured to be calculated as a daily fee on the basis of the payment application date or subscription date.

For example, if a service use fee is 9,900 Won for a period of one month (hereinafter assuming that all months have 30 days) and periodic fixed fee for the first month, 9,900 Won is paid by the subscriber 100 on March 21, irrespective of the payment application date or subscription date. At this time, an amount of money overpaid on March 21 is stored as a credit, and the advance payment is calculated as a daily fee. Accordingly, when the daily fee is simply calculated based on the fixed fee of 9,900 Won a month, 6,600 Won overpaid for 20 days of 9,900 Won for the March payment is stored as a credit.

Then, 3,300 Won excluding 6,600 Won stored as the credit is automatically paid for the April payment on a payment update date of the next month, April 1. Therefore, 6,600 Won, is paid in advance for April service use.

If a system error signal is detected by the error detecting unit 212, the control unit 213 causes the display unit 217 to display payment acknowledgement error information to inform the subscriber 100 of the payment acknowledgement error information.

At this time, as a method of informing the subscriber 100 of the payment acknowledgement error information, there may be various methods such as notes, e-mails, pop-up windows at a log-in, and the like. Particularly, when the subscriber 100 is informed of the payment acknowledgement error information, a menu through which the subscriber 100 can apply for re-payment is also provided to the subscriber 100 to induce the subscriber 100 to the re-payment and facilitate a re-payment procedure.

At this time, the service provider 200 includes a use particulars database 223 in which information on use particulars of the subscriber 100 is stored. For example, information such as various kinds of games used by the subscriber 100, items purchased by the subscriber 100, presence or absence of advance payment of the subscriber 100, and the like may be stored in the use particulars database 223.

When the system error signal is detected, the control unit 213 grants the right to use the service for a prescribed time to the subscriber 100 if it is determined from the use particulars database 223 that the subscriber 100 has the advance payment.

For example, as shown in the above example, if the subscriber 100 applies for payment on March 21 and a payment acknowledgement error occurs on a payment update date of April 1, the subscriber 100 is credited with 6,600 Won. In this case, the subscriber 100 can be granted the right to use the service for 20 days corresponding to the advance payment of 6,600 on the basis of a daily fee into which the periodic fixed fee is simply converted, without any annulment or an indiscriminate annulment on April 1.

In addition, if the subscriber 100 applies for re-payment after a prescribed period of time has elapsed from the date on which the payment acknowledgement error occurs, the control unit 213 causes a payment demand signal for an amount of money excluding the advance payment from the periodic fixed fee to be transmitted through the output unit 216 to the payment acknowledgement server 400. In addition, the control unit 213 causes the fee calculating unit 215 to calculate a balance excluding the advance payment overpaid on the re-payment application date from the periodic fixed fee on the payment date of the time period immediately subsequent to the re-payment application date, and then causes a balance payment demand signal to be transmitted through the output unit 216 to the payment acknowledgement server 400.

In addition, if the subscriber 100 applies for annulment after a prescribed period of time elapses from the date on which the payment acknowledgement error occurs under a condition where the subscriber has the right to use the service, the control unit 213 causes the fee calculating unit 215 to calculate an amount of refund in consideration of the advance payment, a use fee according to use time and use particulars from the payment acknowledgement error occurrence date to the annulment application date, and the like, with reference to the use particulars database 223. Then, the control unit 213 causes a payment cancel demand signal corresponding to the refund to be transmitted through the output unit 216 to the payment acknowledgement server 400.

In addition, if the right to use the service is not granted to the subscriber 100 from the payment acknowledgement error occurrence date, the advance payment and use particulars of the subscriber 100 are considered in calculating the refund.

In the above example, if the subscriber 100 applies for re-payment on April 11, just 3,300 Won is paid since 6,600 Won remains, which is an amount of money carried forward from March irrespective of the re-payment application date. Also, the advance payment overpaid on the basis of the re-payment application date is 3,300 Won overpaid for 10 days from April 1 to April 10 on the basis of a daily fee. Accordingly, an amount of money (i.e., 3,300 Won) excluding the advance payment of 3,300 Won overpaid on the basis of the re-payment application date from the periodic fixed fee of 9,900 Won is paid on May 1 which is a payment date of the time period immediately subsequent to the re-payment application date of April 11.

Here, if the subscriber 100 applies for annulment on April 10, a refund is first calculated by subtracting an amount of money involved with system use particulars including an item use fee before the annulment application from the advance payment, 6,600 Won, of the subscriber 100. Here, if the right to use the service is granted to the subscriber 100 for a payment acknowledgement error time, use time and use particulars from April 1 to April 10 is also considered in calculating the refund. In other words, if March use particulars of the subscriber 100 are concentrated on purchase of expensive items, and accordingly, the fee according to the use particulars far exceeds the simply calculated advance payment of 6,600 Won, the refund can be configured to become zero.

Figure 4:
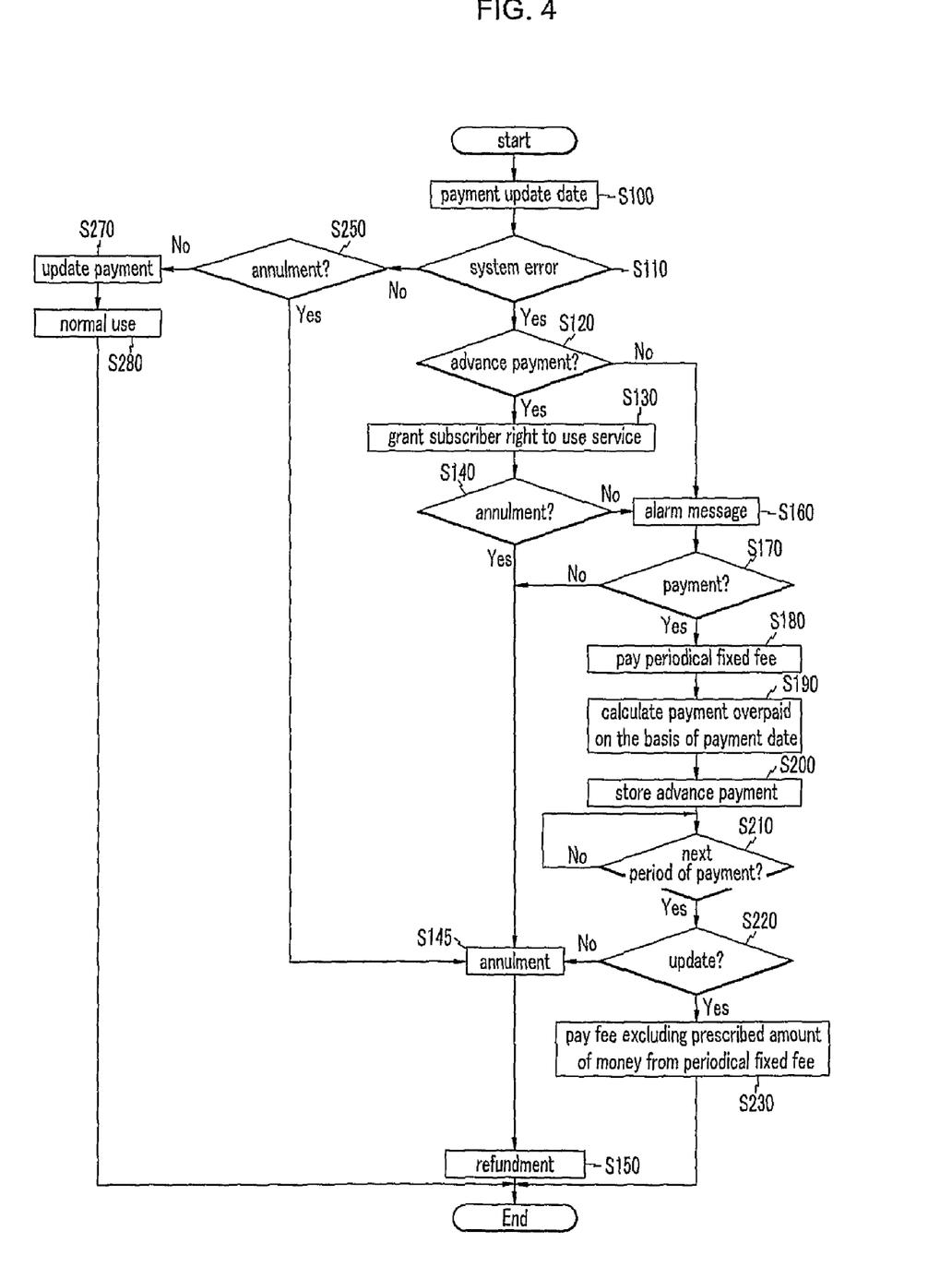
FIG. 4 is a control flowchart of the payment system of FIG. 1.

Hereinafter, a control method of the periodic payment system for service use fees according to an embodiment of the present invention will be described in detail with reference to FIG. 4.

A user selects service goods to be used and applies for a periodic fixed payment to pay for the selected service goods. That is, the user selects one of various service goods provided by the service provider 200 and then selects one of fees for service goods and one of payment methods.

For example, the service provider 200 provides on-line game services in which fees are imposed on each game and each item, and can allow the user to use all services provided by the service provider 200, including the on-line game services, at a fixed monthly payment of the user. At this time, a range of services which can be used by the user may be differently set according to fixed fees paid monthly.

Then, the advance payment, which is an amount of money for payment overpaid on the basis of the payment application date or subscription date of the subscriber 100, is calculated and stored. The advance payment is simply calculated by the daily fee into which the periodic fixed fee is converted, and is the sum of fees for a period of time during which the subscriber 100 did not use the service in a corresponding period of payment. That is, as shown in the above example, if the subscriber 100 applies for payment and pays 9,900 Won on March 21, 6,600 Won, which is a fee for 20 days from March 1 to March 20 during which the subscriber 100 did not use the service, is calculated as the advance payment.

In addition, if the subscriber 100 does not request annulment of service use on the payment date of the time period immediately subsequent to the subscription date, an amount of money excluding the advance payment from the periodic fixed fee is paid. On the subsequent payment update date, the periodic fixed fee is paid, and accordingly, the subscriber 100 can use the service normally (S100, S270, and S280). In addition, if the subscriber 100 requests annulment of service use on the payment update date (S100 and S250), the service use of the subscriber 100 is annulled (S145) and a refund procedure is progressed (S150).

However, if a payment acknowledgement error occurs on the payment update date (S100 and S110), the service provider 200 shows one of various types of alarm messages, such as notes, e-mails, pop-up windows, and the like, to the subscriber 100 to inform the subscriber 100 of the occurrence of the payment acknowledgement error (S160). Particularly, when the service provider 200 informs the subscriber 100 of the occurrence of the payment acknowledgement error, a menu through which the subscriber 100 can apply for re-payment is also provided to the subscriber 100 to induce the subscriber 100 to the re-payment and facilitate a re-payment procedure.

At this time, the service provider 200 checks whether or not the subscriber 100 is credited with the remaining amount of the received full payment of the periodic fixed fee (S120), and then, if the subscriber 100 is credited with the amount overpaid at an immediately previous time period of payment, grants the subscriber 100 the right to use the service for a period of time corresponding to the credit (S130).

At this time, if the payment acknowledgement error occurs on the payment update date, the right to use the service may be suspended until application of re-payment of the subscriber 100.

Here, even when the subscriber 100 is credited with the advance payment and has the right to use the service for a prescribed period of time under the condition of payment acknowledgement error, if the subscriber 100 does not apply for the re-payment until a service use permission term elapses, the service use of the subscriber 100 is annulled (S170 and S145).

On the contrary, if the subscriber 100 who is credited with the advance payment and has the right to use the service for a prescribed period of time under the condition of payment acknowledgement error applies for the re-payment, an amount of money excluding the advance payment from the periodic fixed fee is paid (S180). At this time, an amount of money overpaid on the basis of the re-payment application date is stored as a credit (S190 and S200).

Next, when the subscriber 100 does not apply for annulment of service use on a payment date of the time period immediately subsequent to the re-payment application date, an outstanding balance is automatically paid (S210, S220, and S230).

On the other hand, when the subscriber 100 who is credited with the advance payment and has the right to use the service for a prescribed period of time under the condition of payment acknowledgement error applies for annulment of service use, the service use of the subscriber 100 is annulled (S140 and S145) and a refund procedure is progressed (S150).

Figure 5:
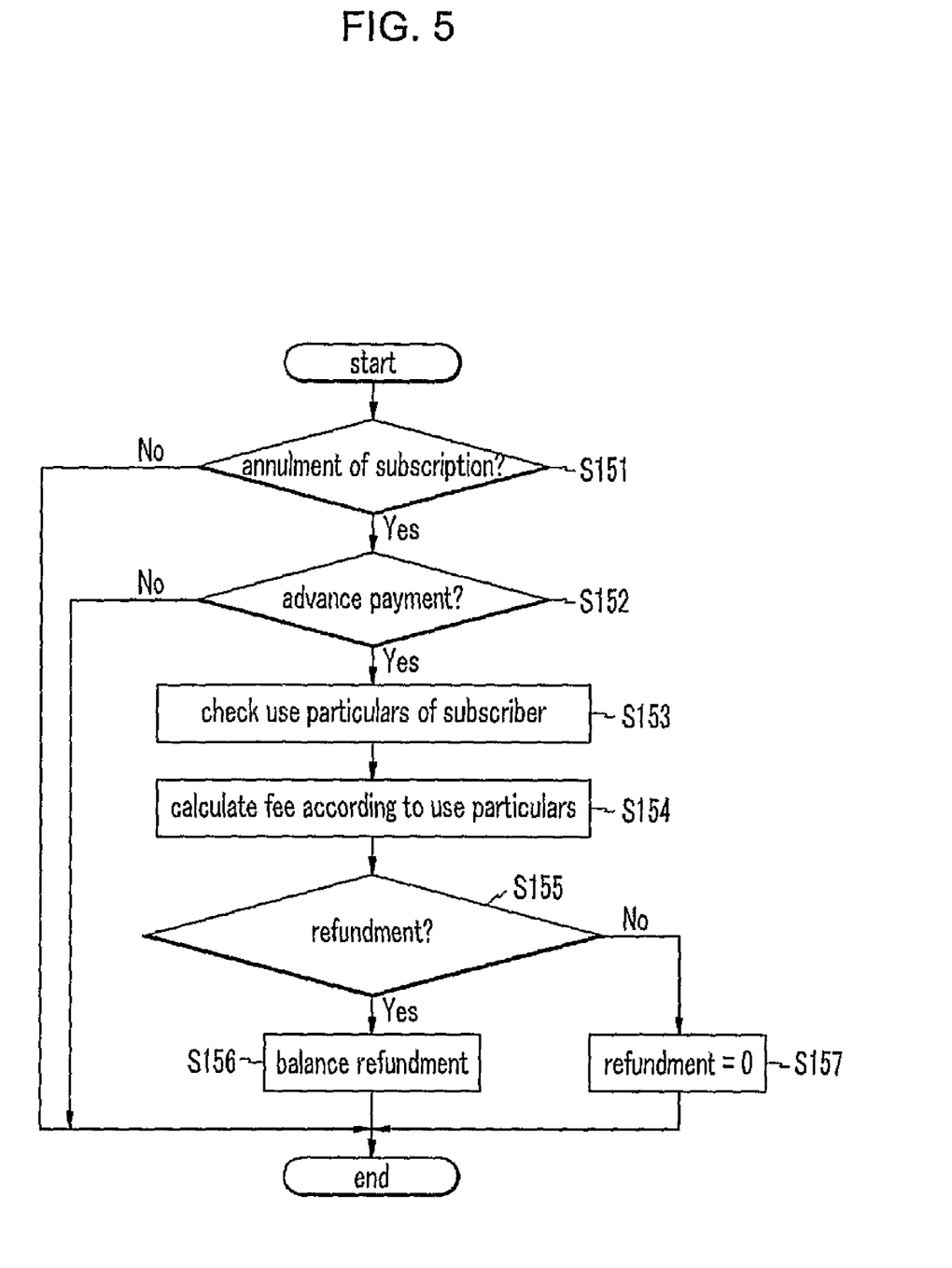
FIG. 5 is a detailed flowchart of a refunding process in FIG. 4.

The refund procedure is as shown in FIG. 5.

If the subscriber 100 applies for annulment of service use or does not apply for re-payment even when the re-payment is needed (S151), the service provider 200 confirms whether or not the subscriber 100 is credited with a credit (S152).

For example, if the subscriber 100 is credited with a credit and applies for annulment of service use after a payment acknowledgement error occurs (S151 and S152), the service provider 200 confirms user particulars of the subscriber 100 for a use period of time from the date of occurrence of payment acknowledgement error to the annulment application date and calculates a use fee according to the use particulars (S153 and S154). In addition, an amount of refund in consideration of the advance payment of the subscriber 100, a use fee according to use time and use particulars from the payment acknowledgement error occurrence date to the annulment application date, and the like, are calculated (S155).

That is, a fee according to use time from the payment acknowledgement error occurrence date to the annulment application date is subtracted from the advance payment of the subscriber 100, and, in some cases, a use fee according to use particulars for the use time is also subtracted from the advance payment of the subscriber 100. Consequently, if an amount of money to be refunded exists, the amount of money is refunded to the subscriber 100 (S156). However, an amount of money to be refunded may not exist according to a result of the calculation (S157).

If the subscriber 100 who is credited with a credit applies for re-payment after an payment acknowledgement error occurs, and applies for annulment of service use on a payment date of the time period immediately subsequent to the re-payment application date (S151), a credit of the subscriber 100 overpaid on the basis of the re-payment application date is confirmed (S152). At this time, in consideration of use particulars of the subscriber 100 at a period of payment including the re-payment application date, the service provider 200 calculates a fee according to the use particulars (S154).

Next, in consideration of the remainder of the advance payment carried forward at an immediately previous period of the re-payment application date, the advance payment overpaid on the basis of the re-payment application date, and use particulars at a period of payment including the re-payment application date, the service provider 200 calculates an amount of money to be refunded (S155). That is, the sum of the remainder of the advance payment carried forward at an immediately previous period of the re-payment application date and the advance payment overpaid on the basis of the re-payment application date is first considered as an amount of money to be refunded, and, in some cases, in consideration of use particulars at a period of payment including the re-payment application date, a fee occurring according to the use particulars is balanced. Consequently, if an amount of money to be refunded exists, the amount of money is refunded to the subscriber 100, however, there may be no amount of money to be refunded according to a result of the calculation (S156 and S157).

In addition, generally, if the subscriber 100 applies for annulment of service use on the payment update date (S151), when the subscriber 100 is credited with the advance payment carried forward from a period of payment immediately before application for annulment of service use (S152), the use particulars for a period of payment immediately before application for annulment of service use are considered (S153). Next, an amount of money excluding a fee according to use particulars for a period of payment immediately before application for annulment of service use from the advance payment of the subscriber 100 is calculated as an amount of money to be refunded (S155).

If the subscriber 100 applies for annulment of service use on the payment update date (S151), when the subscriber 100 is not credited with the advance payment carried forward from a period of payment immediately before application for annulment of service use, it is natural that there is no amount of money to be refunded since there is no advance payment to be considered for refund.

Although the most practical and preferred embodiments of the present invention have been described in detail, it is obvious to those skilled in the art that the present invention is not restricted in the embodiments and may be modified or changed in various forms without deviating from the spirit and scope of the invention as set forth in the annexed claims.

INDUSTRIAL APPLICABILITY

As apparent from the above description, according to the present invention, since a periodic fixed fee is imposed on service use of a subscriber when the subscriber applies for payment for the service use, irrespective of a payment application date or subscription date, the service provider secures a credit for an amount of money overpaid on the payment application date or subscription date. Accordingly, an ill-intentioned secession of the subscriber from the service, such as early application for annulment of service use after the subscriber applies for payment in the last half of a period of payment and uses the service more cheaply than the normal fee in the periodic fixed payment system, can be prevented.

In addition, the subscriber pays a fixed amount of money irrespective of the payment application date or subscription date, an overpaid amount of money is automatically paid after being adjusted at a period of payment immediately after the payment application date or subscription date, and a fixed amount of money is automatically paid from the next period of payment. That is, if the subscriber pays a fixed amount of money without any need to calculate a service use fee according to a payment application date or subscription date on which the subscriber directly intervenes with payment, subsequent service use fees are automatically paid after being automatically adjusted. This provides a simple and convenient calculation from a viewpoint of the subscriber.

In addition, if the subscriber requests annulment of service use, an amount of money considering a credit and use fees according to use time and use particulars from the latest payment date is refunded to the subscriber. Therefore, a reasonable payment and refund method can be provided to both the service provider and the subscriber.

In addition, even if a payment acknowledgement error occurs on a payment update date due to any abnormality of the payment system, since the subscriber is informed of the occurrence of payment acknowledgement error, he can actively cope with the abnormality of the payment system. Accordingly, the payment system can induce subscribers who wish to continue to use the service to re-payment of service use and can prevent the subscribers from seceding from the service.

Furthermore, even under a condition of occurrence of a payment acknowledgement error, if the subscriber is credited with a credit, since the subscriber can use the service for a prescribed time according to an amount of advance payment he is credited with, inconvenience of the subscriber can be minimized.

What is claimed is:

1. A computer-implemented method of managing an account for an online service provider, the online service provider providing the service to its subscribers on a basis of a periodic fixed fee system, the method comprising the steps of:
   receiving billing information for a new subscriber to an online service from a service provider, the new subscriber subscribing to the online service on the basis of a periodic fixed fee system, the periodic fixed fee being applied for a same time period to a group of its subscribers;
   charging by a computing device a full payment of the periodic fixed fee for a first billing cycle to the new subscriber irrespective of starting date of the subscription;
   applying by said computing device a prorated amount out of a received full payment of the periodic fixed fee to the first billing cycle, the prorated amount being established based upon remaining days of the first billing cycle from the starting date of the subscription;
   applying by said computing device a remaining amount of the received full payment of the periodic fixed fee to a second billing cycle as a credit, the remaining amount being the received full payment deducted by the prorated amount, wherein the first billing cycle and the second billing cycle have a same calendar period;
   sending outstanding balance information for the second billing cycle on a subscriber's account to the subscriber;
   upon detection of payment acknowledgement error information for said second billing cycle, allowing said new subscriber to use the service without stopping during a period to which said credit applies; and
   upon receipt of unsubscription request from the new subscriber before a starting date of the second billing cycle, charging said credit for services used by said new subscriber for the first billing cycle.

2. The method of claim 1, wherein the outstanding balance information on the subscriber's account is sent to the subscriber's mobile device and the payment being approved via the subscriber's mobile device.

3. The method of claim 1, if payment of the outstanding balance is not acknowledged due to a predetermined error occurred on the payment, further comprising the steps of:
   sending error information to the subscriber; and
   sending error information to the service provider, to allow the service provider to provide the subscriber with the service without stopping during the period based upon the credit applied to the second billing cycle.

4. A computer-implemented method of managing an account for an online service provider, the online service provider providing the service to its subscribers on a basis of a periodic fixed fee system, the method comprising the steps of:
   receiving a subscription agreement to an online service from a new subscriber, the new subscriber subscribing to the online service on the basis of a periodic fixed fee system, the periodic fixed fee being applied a the same time period to a group of its subscribers;
   charging by a computing device a full payment of the periodic fixed fee for a first billing cycle to the new subscriber irrespective of starting date of the subscription;

applying by said computing device a prorated amount out of a received full payment of the periodic fixed fee to the first billing cycle, the prorated amount being established based upon remaining days of the first billing cycle from the starting date of the subscription;

applying by said computing device a remaining amount of the received full payment of the periodic fixed fee to the second billing cycle as a credit, the remaining amount being the received full amount deducted by the prorated amount, wherein the first billing cycle and the second billing cycle have a same calendar period;

sending outstanding balance information for the second billing cycle on a subscriber's account to the subscriber;

upon detection of payment acknowledgement error information for said second time period, allowing said new subscriber to use the service without stopping during a period to which said credit applies; and upon receipt of unsubscription request from the new subscriber before a starting date of the second billing cycle, charging said credit for services used by said new subscriber for the first billing cycle.

5. The method of claim 4, wherein the outstanding balance information on the subscriber's account is sent to the subscriber's mobile device and the payment being approved via the subscriber's mobile device.

6. The method of claim 4, if payment of the outstanding balance is not acknowledged due to a predetermined error occurred on the payment, further comprising the steps of:
sending error information to the subscriber; and
providing the subscriber with the service without stopping during the period based upon the credit applied to the second billing cycle.

7. A service provider for providing a service to subscribers on the basis of a periodic fixed fee system, the service provider comprising:
a processor;
a memory to communicate with the processor;
means for receiving billing information for a new subscriber for an online service from a service provider, the new subscriber subscribing to the online service on the basis of a periodic fixed fee system, the periodic fixed fee being applied for a same time period to a group of its subscribers;
means for charging a full payment of the periodic fixed fee for a first billing cycle to the new subscriber irrespective of starting date of the subscription;
means for applying a prorated amount out of a received full payment of the periodic fixed fee to the first billing cycle, the prorated amount being established based upon remaining days of the first billing cycle from the starting date of the subscription;
means for applying a remaining amount of the received full payment of the periodic fixed fee to a second billing cycle as a credit, the remaining amount being the received full payment deducted by the prorated amount, wherein the first billing cycle and the second billing cycle have a same calendar period;
upon detection of payment acknowledgement error information for said second billing cycle, means for allowing said new subscriber to use the service without stopping during a period to which said credit applies; and
upon receipt of unsubscription request from the new subscriber before a starting date of the second billing cycle, means for charging said credit for services used by said new subscriber for the first billing cycle.

8. The service provider of claim 7, wherein when a payment acknowledgement error occurs, the service provider grants the subscriber the right to use the service for a prescribed time if the subscriber is credited with the remaining amount of the received full payment of the periodic fixed fee.

9. The service provider of claim 8, wherein,
if the subscriber applies for annulment of service use within a predetermined time period from occurrence of the payment acknowledgement error under a predetermined condition, the service provider calculates an amount of refund based upon the prorated amount, a use fee according to use time, and use particulars from the payment acknowledgement error occurrence date to the annulment application date.

10. The service provider of claim 7, wherein if the subscriber applies for re-payment within a predetermined time period from occurrence of the payment acknowledgement error, the service provider causes the prorated amount carried forward from a period of payment immediately before a period of payment including a re-payment application date, from the periodic fixed fee to be paid, and causes the remaining amount of the received full payment of the periodic fixed fee overpaid on the re-payment application date from the periodic fixed fee to be paid on the payment update date immediately after the re-payment application date.

* * * * *